(12) United States Patent
Neet

(10) Patent No.: US 6,885,124 B2
(45) Date of Patent: Apr. 26, 2005

(54) STATOR WINDING HAVING RADIAL ALIGNED WRAPS

(75) Inventor: Kirk E. Neet, Saline, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/899,338

(22) Filed: Jul. 26, 2004

(65) Prior Publication Data

US 2004/0263016 A1 Dec. 30, 2004

Related U.S. Application Data

(63) Continuation-in-part of application No. 10/443,441, filed on May 22, 2003.
(60) Provisional application No. 60/454,996, filed on Mar. 14, 2003.

(51) Int. Cl.$^7$ ............................................. H02K 17/00
(52) U.S. Cl. ........................................ 310/208; 310/201
(58) Field of Search ................................. 310/201–208

(56) References Cited

U.S. PATENT DOCUMENTS

| | | | |
|---|---|---|---|
| 3,566,171 A | 2/1971 | Tichy et al. | 310/180 |
| 3,634,708 A | 1/1972 | Fisher et al. | 310/195 |
| 3,660,705 A | 5/1972 | Willyoung | 310/178 |
| 3,753,060 A | 8/1973 | Greenwell | 318/227 |
| 3,753,062 A | 8/1973 | Greenwell | 318/222 R |
| 3,780,324 A | 12/1973 | Greenwell | 310/180 |
| 3,838,322 A | 9/1974 | Greenwell | 318/222 |
| 3,854,077 A | 12/1974 | Greenwell | 318/227 |
| 4,115,915 A | 9/1978 | Godfrey | 29/296 |
| 4,197,475 A | 4/1980 | Ban et al. | 29/596 |
| 4,451,749 A | 5/1984 | Kanayama et al. | 310/203 |
| 4,617,725 A | 10/1986 | Holter et al. | 310/62 |
| 4,808,868 A | 2/1989 | Roberts | 29/598 |
| 4,896,063 A | 1/1990 | Roberts | 310/68 R |
| 4,959,573 A | 9/1990 | Roberts | 310/68 R |
| 5,231,324 A | 7/1993 | Kawamura et al. | 310/68 R |
| 5,343,105 A | 8/1994 | Sakabe et al. | 310/198 |
| 5,444,321 A | 8/1995 | Honda et al. | 310/279 |
| 5,449,962 A | 9/1995 | Shichijyo et al. | 310/263 |
| 5,519,266 A | 5/1996 | Chitayat | 310/184 |
| 5,539,265 A | 7/1996 | Harris et al. | 310/12 |
| 5,714,824 A | 2/1998 | Couture et al. | 310/263 |
| 5,936,326 A | 8/1999 | Umeda et al. | 310/208 |
| 5,955,804 A | 9/1999 | Kusase et al. | 310/179 |

(Continued)

FOREIGN PATENT DOCUMENTS

| | | |
|---|---|---|
| EP | 1 134 872 | 9/2001 |
| EP | 1 109 289 | 4/2002 |
| JP | 55 120114 | 9/1980 |
| JP | 56 83911 | 7/1981 |
| JP | 57-206244 A | 12/1982 |
| JP | 58 192447 | 11/1983 |
| JP | 61-189155 | 8/1986 |
| JP | 3-107342 A | 5/1991 |
| JP | 11-178264 | 7/1999 |

*Primary Examiner*—Dang Le
(74) *Attorney, Agent, or Firm*—Brinks, Hofer Gilson & Lione

(57) ABSTRACT

An electric machine stator having end loop segments includes a multi-phase stator winding having a plurality of radially aligned partial wraps, wraps, and wrap sets, that are adapted to be placed in a plurality of circumferentially spaced axially-extending core slots in a surface of a stator core. The stator winding includes a plurality of slot segments alternately connected at the first and second ends of the stator core by a plurality of end loop segments to form the winding. The end loop segments include first and second sloped portions meeting at an apex portion. Each of the end loop segments includes a radial outward adjustment and a radial inward adjustment and forms a cascaded winding pattern.

34 Claims, 9 Drawing Sheets

U.S. PATENT DOCUMENTS

| | | |
|---|---|---|
| 5,955,810 A | 9/1999 | Umeda et al. ................. 310/59 |
| 5,962,943 A | 10/1999 | Shervington ................ 310/156 |
| 5,965,965 A | 10/1999 | Umeda et al. ................. 310/52 |
| 5,986,375 A | 11/1999 | Umeda et al. ............... 310/180 |
| 5,994,802 A | 11/1999 | Shichijyo et al. ............. 310/51 |
| 5,998,903 A | 12/1999 | Umeda et al. ............... 310/179 |
| 6,011,332 A | 1/2000 | Umeda et al. ................. 310/58 |
| 6,037,695 A | 3/2000 | Kanazawa et al. .......... 310/263 |
| 6,049,154 A | 4/2000 | Asao et al. .................. 310/201 |
| 6,051,906 A | 4/2000 | Umeda et al. ............... 310/179 |
| 6,059,969 A | 5/2000 | Mizutani .................... 310/263 |
| 6,078,116 A | 6/2000 | Shiga et al. ............. 310/60 R |
| 6,091,169 A | 7/2000 | Umeda et al. ................. 310/62 |
| 6,097,130 A | 8/2000 | Umeda et al. ............... 310/263 |
| 6,124,660 A | 9/2000 | Umeda et al. ............... 310/215 |
| 6,137,201 A | 10/2000 | Umeda et al. ............... 310/201 |
| 6,137,202 A | 10/2000 | Holmes et al. .............. 310/180 |
| 6,137,430 A | 10/2000 | Lyden et al. ................. 341/145 |
| 6,147,430 A | 11/2000 | Kusase et al. ............... 310/215 |
| 6,147,432 A | 11/2000 | Kusase et al. ............... 310/260 |
| 6,166,461 A | 12/2000 | Kusase et al. ................. 310/58 |
| 6,177,747 B1 | 1/2001 | Maeda et al. ............... 310/179 |
| 6,181,043 B1 | 1/2001 | Kusase et al. ............... 310/201 |
| 6,181,045 B1 | 1/2001 | Umeda et al. ............... 310/201 |
| 6,201,332 B1 | 3/2001 | Umeda et al. ............... 310/184 |
| 6,204,586 B1 | 3/2001 | Umeda et al. ............... 310/179 |
| 6,208,060 B1 | 3/2001 | Kusase et al. ............... 310/254 |
| 6,211,594 B1 | 4/2001 | Umeda et al. ............... 310/180 |
| 6,222,295 B1 | 4/2001 | Umeda et al. ............... 310/179 |
| 6,242,836 B1 | 6/2001 | Ishida et al. ................. 310/215 |
| 6,252,326 B1 | 6/2001 | Umeda et al. ............... 310/179 |
| 6,268,678 B1 | 7/2001 | Asao et al. .................. 310/201 |
| 6,281,614 B1 | 8/2001 | Hill ............................ 310/207 |
| 6,285,105 B1 | 9/2001 | Asao et al. .................. 310/208 |
| 6,291,918 B1 | 9/2001 | Umeda et al. ............... 310/215 |
| 6,333,573 B1 | 12/2001 | Nakamura .................... 310/45 |
| 6,335,583 B1 | 1/2002 | Kusase et al. ............... 310/256 |
| 6,337,530 B1 | 1/2002 | Nakamura et al. .......... 310/263 |
| 6,348,750 B1 | 2/2002 | Taji et al. .................... 310/186 |
| 6,373,164 B1 * | 4/2002 | Nishimura .................. 310/207 |
| 6,407,476 B1 | 6/2002 | Nishimura .................. 310/180 |
| 6,501,204 B1 | 12/2002 | Oohashi et al. ............. 310/179 |
| 6,501,205 B1 * | 12/2002 | Asao et al. .................. 310/184 |
| 6,504,283 B1 | 1/2003 | Asao et al. .................. 310/256 |
| 6,552,463 B1 | 4/2003 | Oohashi et al. ............. 310/207 |
| 6,570,289 B1 | 5/2003 | Liang et al. ................. 310/179 |
| 6,573,622 B1 | 6/2003 | Lim et al. ..................... 310/12 |
| 2001/0011852 A1 | 8/2001 | Nakamura et al. .......... 310/215 |
| 2001/0019234 A1 | 9/2001 | Murakami et al. .......... 310/180 |
| 2001/0020807 A1 | 9/2001 | Imori et al. .................. 310/208 |
| 2001/0024071 A1 | 9/2001 | Yoshida et al. ............. 310/201 |
| 2001/0026109 A1 | 10/2001 | Higashino et al. .......... 310/201 |
| 2001/0030487 A1 | 10/2001 | Higashino et al. .......... 310/201 |
| 2001/0040415 A1 | 11/2001 | Asao et al. .................. 310/179 |
| 2001/0040416 A1 | 11/2001 | Nakamura et al. .......... 310/201 |
| 2001/0040418 A1 | 11/2001 | Higashino et al. .......... 310/179 |
| 2002/0033646 A1 | 3/2002 | Tanaka et al. ................ 310/71 |
| 2002/0125784 A1 | 9/2002 | Bramson et al. ............ 310/184 |
| 2003/0048032 A1 | 3/2003 | Brown et al. ............... 310/233 |
| 2003/0132680 A1 | 7/2003 | Nakamura et al. .......... 310/180 |
| 2003/0137204 A1 | 7/2003 | Neet .......................... 310/179 |
| 2003/0137205 A1 | 7/2003 | Neet .......................... 310/180 |
| 2003/0137207 A1 | 7/2003 | Tamura et al. ............. 310/184 |
| 2003/0173860 A1 | 9/2003 | Even .......................... 310/259 |
| 2003/0193253 A1 | 10/2003 | Arimitsu et al. ............ 310/114 |
| 2004/0145267 A1 | 7/2004 | Lowry et al. ............... 310/215 |

* cited by examiner

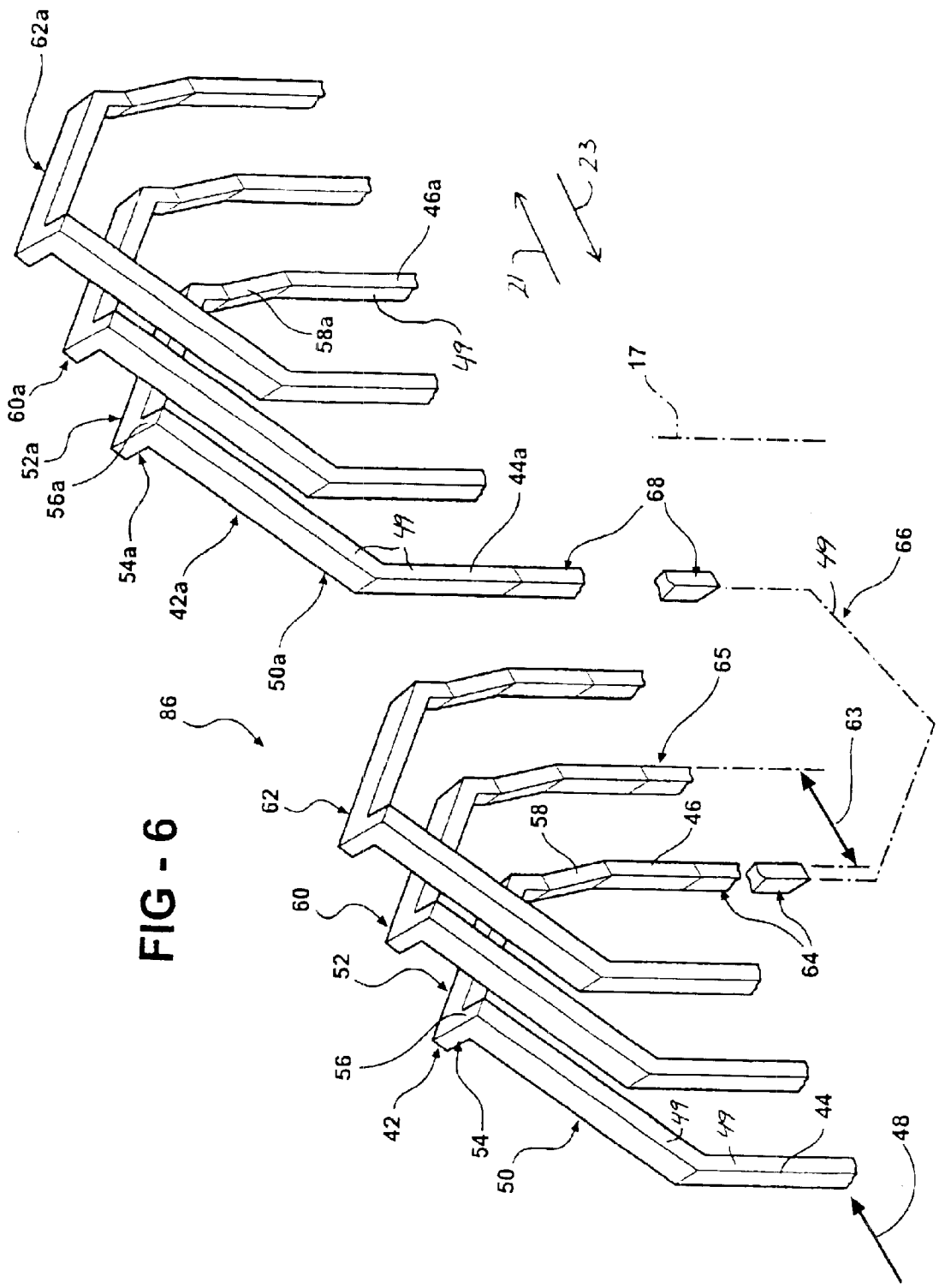

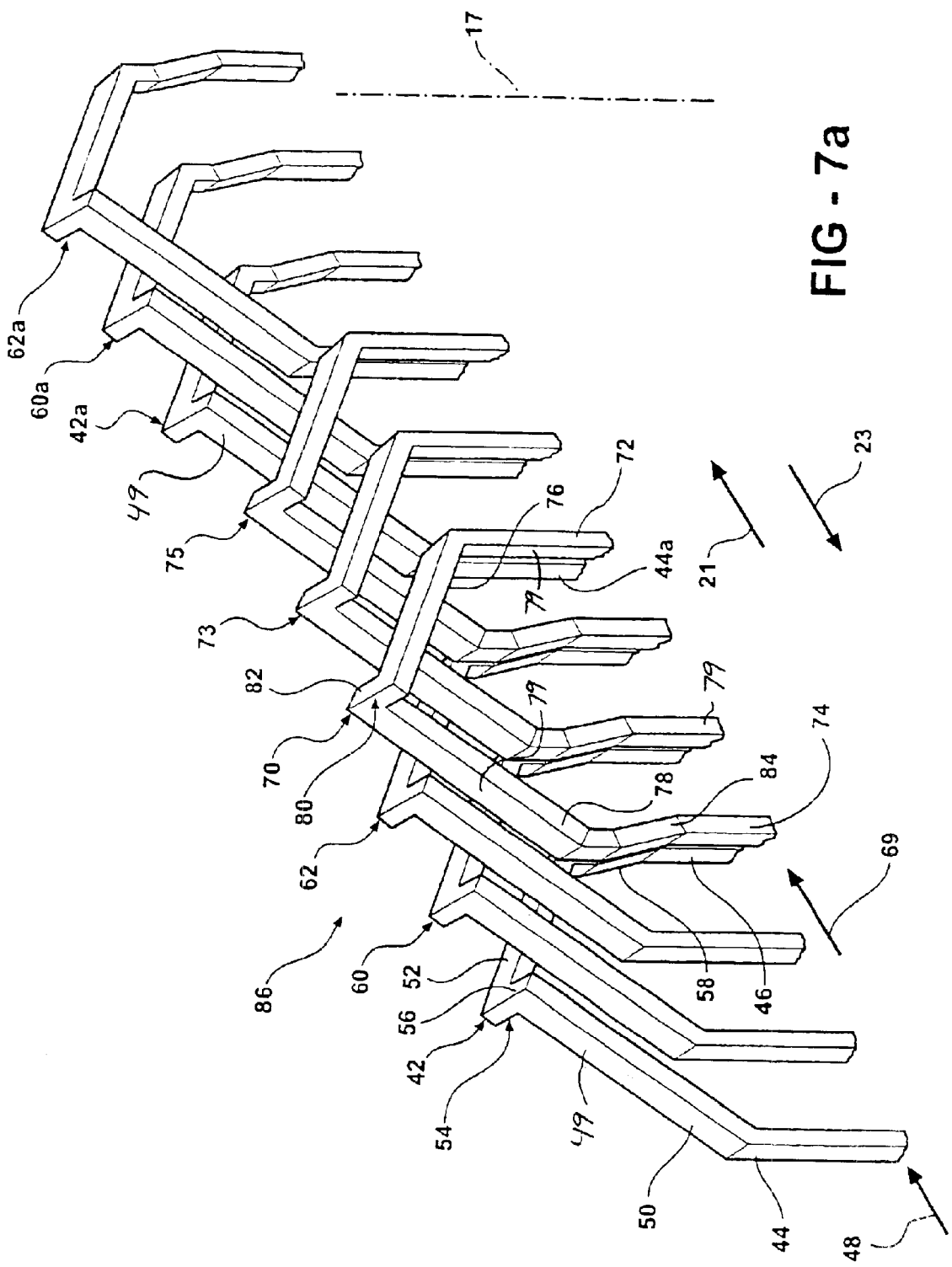

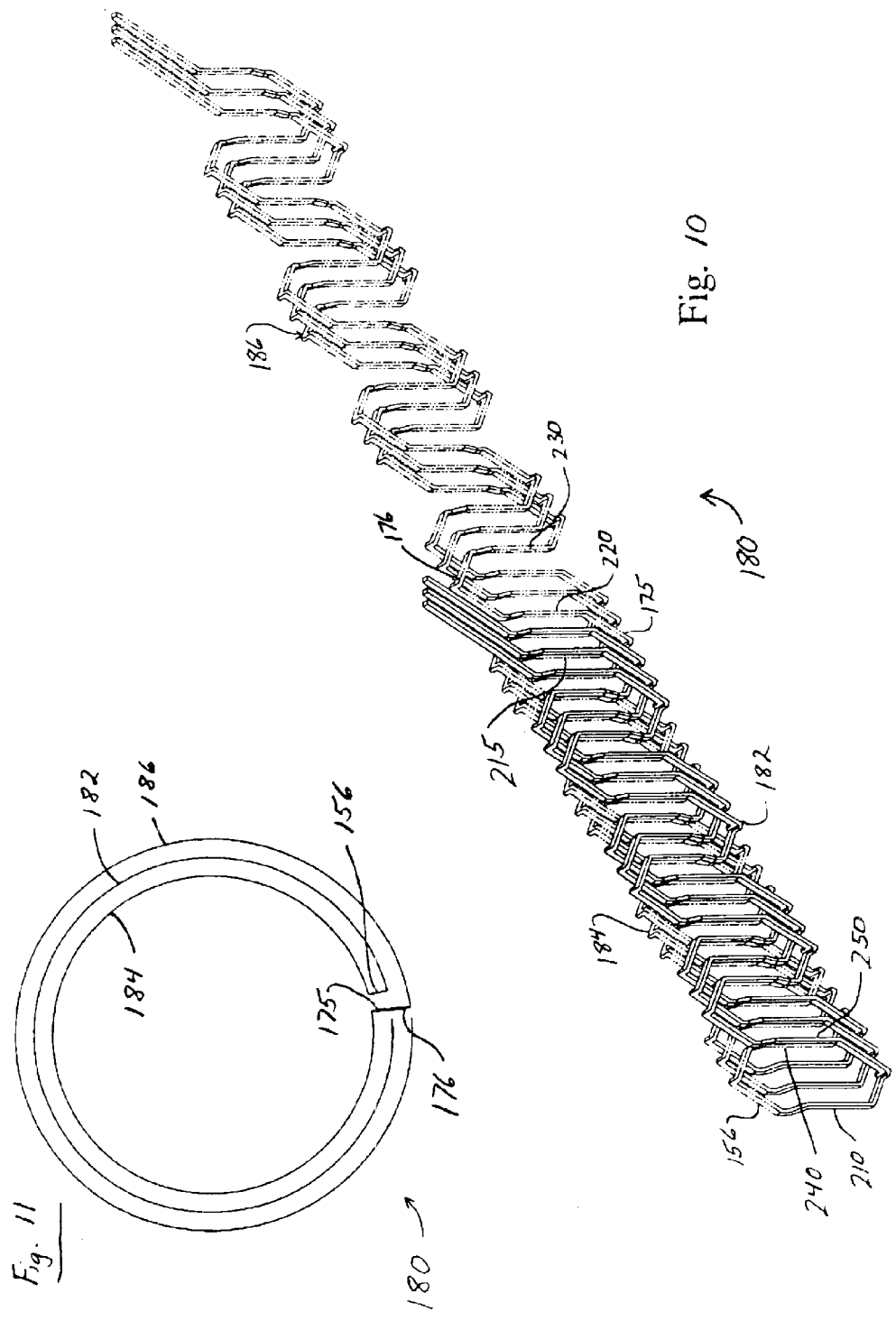

STATOR WINDING HAVING RADIAL ALIGNED WRAPS

CROSS REFERENCE TO RELATED APPLICATION

The present invention is a continuation-in-part application corresponding to U.S. patent application Ser. No. 10/443,441 filed on May 22, 2003 entitled "Stator Winding Having Cascaded End Loops", which corresponds to Provisional Patent Application Ser. No. 60/454,996, filed on Mar. 14, 2003. entitled "Stator Winding Having Cascade End Loops".

BACKGROUND OF THE INVENTION

The present invention relates generally to electric machines and, in particular, to a stator winding for an electric machine having radial aligned partial wraps, wraps, and wrap sets. Electric machines, such as alternating current electric generators, alternators, or direct current electric motors are well known. Prior art alternators typically include a stator assembly and a rotor assembly disposed in an alternator housing. The stator assembly is mounted to the housing, or housings, and includes a generally cylindrically-shaped stator core having a plurality of slots formed therein. The rotor assembly includes a rotor attached to a generally cylindrical shaft that is rotatably mounted in the housing and is coaxial with the stator assembly. The stator assembly includes a plurality of wires wound thereon, forming windings. The stator windings are formed of slot segments that are located in the slots and end loop segments that connect two adjacent slot segments of each phase and are formed in a predetermined multi-phase (e.g. three or six) winding pattern in the slots of the stator core. The rotor assembly can be any type of rotor assembly, such as a "claw-pole" rotor assembly, which typically includes opposed poles as part of claw fingers that are positioned around an electrically charged rotor coil. The rotor coil produces a magnetic field in the claw fingers. As a prime mover, such as a steam turbine, a gas turbine, or a drive belt from an automotive internal combustion engine, rotates the rotor assembly, the magnetic field of the rotor assembly passes through the stator windings, inducing an alternating electrical current in the stator windings in a well known manner. The alternating electrical current is then routed from the alternator to a distribution system for consumption by electrical devices or, in the case of an automotive alternator, to a rectifier and then to a charging system for an automobile battery.

One type of device is a high slot fill stator, which is characterized by rectangular shaped conductors whose width, including any insulation, fits closely to the width, including any insulation, of the rectangular shaped core slots. High slot fill stators are advantageous because they are efficient and help produce more electrical power per winding than other types of prior art stators. These stators, however, are disadvantageous because the windings are typically interlaced, in which two wires for each phase are required to alternate outer and inner radial portions of each slot. This interlaced design requires an even number of conductors per slot because each phase must include two conductors or a multiple of two conductors. This is because one end loop segment connects the slot segment housed in an outer radial depth of the first slot to a slot segment housed in an inner radial depth of the second slot. This conductor leaves a void in the outer radial depth of the second slot, therefore a second conductor must connect the slot segment housed in an outer radial depth of the second slot to a slot segment housed in an inner radial depth of the third slot. These interlaced windings require either an interlacing process to interlace continuous conductors of all the phases prior to inserting the winding into the core or a connection process to individually connect U shaped hairpins that are axially inserted into the core. Therefore, in either case, the interlaced wind has disadvantageously increased the complexity of placing the winding to the stator. Also, because an even number of conductors is required per phase, the stator either must have an even number of electrical turns or an odd number of turns with a very complex connection scheme of parallel and series conductors.

Increasing the number of turns in an electrical machine's stator increases the generated voltage and therefore, the power output at low rotational speeds, but it also increases the inductance, and therefore, reduces the output at high rotational speeds. Therefore, choosing the optimal number of electrical turns for a given application changes the shape of the output vs. rotational speed curve. To create a stator winding having a plurality of electrical turns in each phase, the conductor must have a plurality of serially connected slot segments housed in each slot. One common method of serially connecting the slot segments is to utilize end loop segments to connect consecutive slot segments of one phase. The portion of a conductor that includes at least two end loop segments connecting at least three consecutive slot segments of one phase is defined as a partial wrap, utilized herein. A partial wrap that winds around a core for one substantial revolution is defined as a wrap, utilized herein. It may, however, be desirable for one or more wraps to terminate prior to completing one full revolution around the core, and therefore, the phrase substantial revolution, utilized herein, defines a pass around a core for at least half of a revolution around the core. For the cascade winding, each partial wrap or wrap of conductor connects slot segments which are located substantially in the same layer, or the same substantial radial distance from the central axis of the core. The end loop segments of the plurality of wraps must be nested such that the end loop segments of the wrap having slot segments housed substantially in one layer do not violate the space of other end loop segments of wraps of other phases with slot segments housed in the same layer as well as end loop segments of wraps having slot segments housed in radial adjacent layers. Furthermore, it is desirable to have a high slot-fill electrical machine that can easily be processed to have an odd number of electrical turns.

It is desirable, therefore, to provide a stator that meets the requirements of a high slot fill stator including a plurality of radial aligned partial wraps, wraps, and wrap sets and therefore a plurality of electrical turns and does not require an even number of conductors per slot.

SUMMARY OF THE INVENTION

A stator for a dynamoelectric machine according to the present invention includes a generally cylindrically-shaped stator core having a plurality of circumferentially spaced and axially-extending core slots in a surface thereof. The core slots extend between a first and a second end of the stator core. The stator also includes a multi-phase stator winding including a plurality, and perhaps even an odd number, of wrap sets, wraps and radial aligned partial wraps. The phrase wrap set, utilized herein, is defined as a group of wraps including a wrap for each phase having slot segments housed in the same layers as the other wraps of that group, yet each wrap being shifted a predetermined number of core slots with respect to each other. Each of the phases includes a plurality of slot segments or portions disposed in the core slots that are alternately connected at the first and second ends of the stator core by a plurality of end loops or end loop segments. Each of the end loop segments of a wrap having slot segments housed in one particular layer includes a first sloped portion substantially co-radial with that particular layer and a second sloped portion substantially non-co-radial with that particular layer, defined in more detail below. The term layer, as utilized herein, is defined as the radial location of the slot segments in the core slots from the central axis of the stator core. For example, the radial location of the outermost slot segments defines the radial location of the outermost layer. The term co-radial, as utilized herein, is defined as two objects being at the same radial distance from an axis, such as the central axis of the stator core, and in the same cylindrical surface. The first and second sloped portions of the end loop segment are connected by an apex portion thereof. Each of the end loop segments includes a radial outward adjustment and a radial inward adjustment to form a nested winding pattern.

Preferably, the stator core for the alternator stator in accordance with the present invention includes a plurality of axially extending slots formed therein that have an angled surface formed into the back of the slots. The angled surfaces are located on consecutive slots on one axial end of the core equal to the number of phases of the alternator stator winding after which the angles are located in slots on the opposite axial end of the core and then for the next consecutive slots equal to the number of alternator phases. This pattern repeats through the circumference of the stator core. Alternatively, the stator core is a standard core with straight axial slots extending from the first axial end of the core to the second axial end of the core. The wrap having slot segments housed in a first layer and the wrap having slot segments housed in a second layer of each of the phases are alternatively formed from one single continuous conductor, creating a reversing end loop for each of the phases.

The cascaded winding pattern in accordance with the present invention advantageously does not require the complex interlaced winding process or the hairpin conductor process of the prior art, and therefore can accommodate an odd number of wraps for each phase, an odd number of slot segments housed in each slot and thereby an odd number of electrical turns. The stator winding is cascaded and not interlaced because the slot segments of a conductor, for a partial wrap or a wrap, do not alternate rearward and forward positions in the slots with other conductors. In addition, the stator winding is cascaded and not interlaced because the end loop segments are formed such that the wrap sets are radially aligned which therefore may allow each wrap set to be serially radially inserted into the stator core, described in more detail below. Furthermore, the stator winding is cascaded and not interlaced because a plurality of wraps and partial wraps are radially aligned for each wrap set which therefore may allow each wrap or partial wrap to be serially radially inserted into the stator core, described in more detail below. Each of the end loop segments advantageously form a cascaded winding pattern.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 6 is a perspective view of a wrap set of end loop segments of a portion of a stator winding in accordance with the present invention including the end loop segment of FIG. 5;

FIG. 7a is a perspective view of a plurality of wrap sets of end loop segments of a stator winding in accordance with the present invention including the wrap set of FIG. 6;

FIG. 10 is a perspective view of a pre-form of the winding for a three phase and three wrap set stator prior to being coiled and placed within the stator core;

FIG. 11 is a schematic view of the winding after being coiled; and

DESCRIPTION OF THE PREFERRED EMBODIMENT

Figure 1:
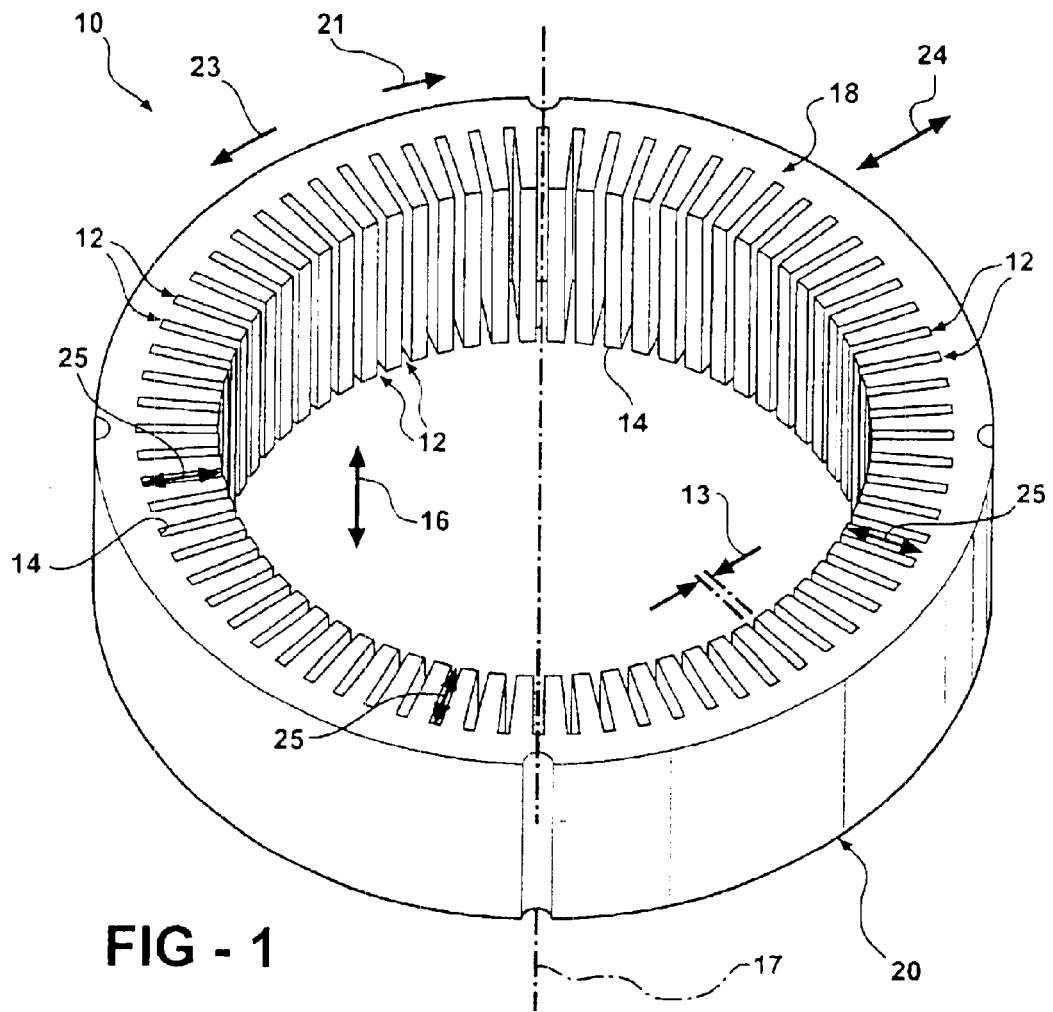
FIG. 1 is a perspective view of a stator core in accordance with the present invention.

Referring now to FIG. 1, a generally cylindrically-shaped stator core is indicated generally at 10. The stator core 10 includes a plurality of core slots 12 formed in a circumferential interior surface 14 thereof. The core slots 12 extend in an axial direction, indicated by an arrow 16, substantially parallel to the central axis 17 of the stator core 10 between a first end 18 and a second end 20 thereof. An axially upward direction is defined as moving toward the first end 18 of the stator core 10 and an axially downward direction is defined as moving toward the second end 20 of the stator core 10. Preferably, the core slots 12 are equally spaced around the circumferential inner surface 14 of the stator core 10 and the respective inner surfaces 14 of the core slots 12 are substantially parallel to the central axis 17. A circumferential clockwise direction is indicated by an arrow 21 and a circumferential counterclockwise direction is indicated by an arrow 23. The core slots 12 define a radial depth 25 along a radial axis, indicated by an arrow 24, and are adapted to receive a stator winding, discussed in more detail below. A radial inward direction is defined as moving towards the central axis 17 of the stator core 10 and a radial outward direction is defined as moving away from the central axis 17. The core slots 12 may have a rectangular cross sectional shape as can be seen in FIG. 1. It is obvious to those skilled in the art that the term rectangular may include a rectangular shape with radii at the corners and/or include a specially shaped slot opening at the inner surface 14 (that may include caps).

Figure 2:
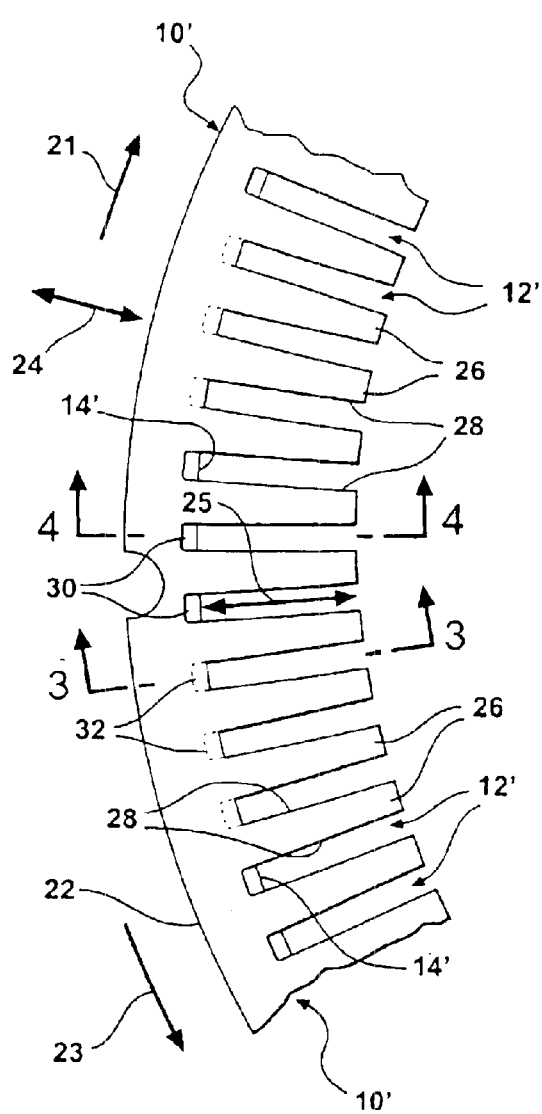
FIG. 2 is a top view of a portion of the stator core shown in FIG. 1.
Figure 3:
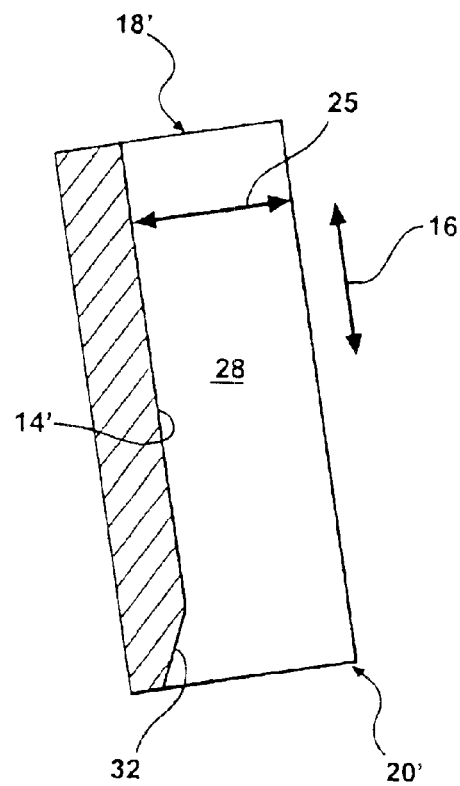
FIG. 3 is a sectional view taken along the line 3—3 in FIG. 2.
Figure 4:
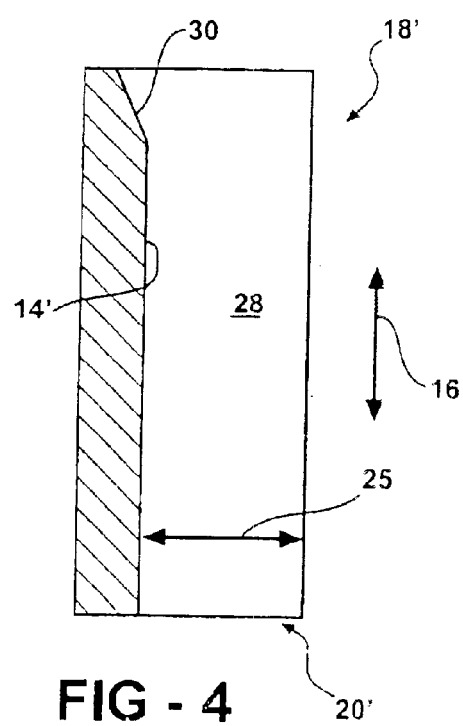
FIG. 4 is a sectional view taken along the line 4—4 in FIG. 2.

There is shown in FIGS. 2–4, a fragmentary view of an alternative embodiment of a stator core, indicated generally at 10'. The stator core 10' includes a plurality of core slots 12' formed in an interior surface 14' thereof. The core slots 12' define a plurality of teeth 26 between a respective interior surface 28 thereof and extend between a first end 28' and a second end 20' of the stator core 10'. A predetermined number of consecutive core slots 12' include an angled surface 30 adjacent the first end 18' of the stator core 10'. The same predetermined number of the next consecutive core slots 12' include an angled surface 32 adjacent the second end 20' of the stator core 10'. The predetermined number of consecutive core slots 12' equals the number of phases of the stator winding, discussed in more detail below. In FIGS. 2–4, the predetermined number is three because the stator core 10' is adapted to receive a three phase alternator stator winding 86 shown in FIGS. 6 and 7. The alternating pattern of angled surfaces, therefore, repeats for every three consecutive core slots 12' and repeats throughout the circumference 14 of the stator core 10'. For a six phase alternator stator winding (not shown), the predetermined number would be six and the alternating pattern would be repeated for every six consecutive slots 12' throughout the circumference 14 of the stator core 10'.

Figure 5:
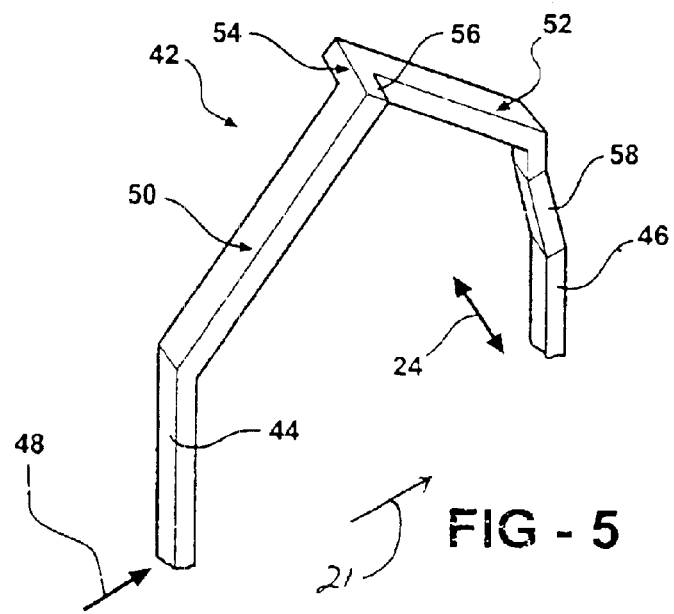
FIG. 5 is a perspective view of an end loop segment of a portion of a stator winding in accordance with the present invention.

Referring now to FIG. 5, an end loop segment is indicated generally at 42. The end loop segment 42 is adapted to be a part of the stator winding 86 and includes a first end portion 44 and a second end portion 46 that are each proximate to a respective slot segment, discussed in more detail below, of the stator winding 86. The first end portion 44 and the second end portion 46 of the end loop segment 42 are at a substantially same radial distance from the central axis 17 of the stator core 10 or 10' and therefore in the same layer. The first end portion 44 and the second end portion 46 form a portion of a wrap of the stator winding 86 whose slot segments are in a same radial distance from the central axis 17 of the stator core 10 or 10' and therefore in the same layer, indicated generally at 48. Although end portions such as 44 and 46 are described as entities, they may, in fact, be portions of the slot segments, discussed in more detail below.

The end loop segment 42 is described in the clockwise direction, 21. The end loop segment 42 includes a first sloped portion 50 and a second sloped portion 52 that meet at an apex portion 54. The first sloped portion 50 is substantially co-radial with the layer 48, the first end portion 44 and the second end portion 46. The second sloped portion 52 is substantially non-co-radial with the layer 48, the first end portion 44 and the second end portion 46. The apex portion 54 includes a first radial extension portion 56. The first radial extension portion 56 extends from the first sloped portion 50 in the radially outward direction, which provides a radial outward adjustment for the end loop segment 42. A second radial extension portion 58 connects the second sloped portion 52 and the second end portion 46. The second radial extension portion 58 extends from the second sloped portion 52 in the radially inward direction, which provides a radial inward adjustment for the end loop segment 42.

While the end loop segment 42 has been shown wherein the radial outward adjustment is adjacent the apex portion 54 and the radial inward adjustment is adjacent the second sloped portion 52, those skilled in the art can appreciate that the radial outward and inward adjustments can be on any one or on any two of the first sloped portion 50, the second sloped portion 52, and the apex portion 54 in order to provide the cascaded winding pattern. Although the radial extension portions, such as 56 and 58, shown in FIGS. 5, 6, 7a, 7b and 9 appear as sharp bends, it is obvious to those skilled in the art that typical radial extension portions, such as 56 and 58, may be more gentle in nature and include radii, not shown.

Referring now to FIG. 6, the end loop segment 42 of FIG. 5 is shown adjacent a plurality of substantially identical end loop segments, indicated generally at 60 and 62. The end loop segments 42, 42a and 66 along with the slot segments 64 and 68, form a portion of a wrap, indicated generally at 49, having slot segments housed in layer 48 of the stator winding 86. Similarly, The end loop segments 60, and 62 each form a portion of a respective wrap similar to wrap 49 having slot segments housed in layer 48 of the stator winding 86 except they are shifted a predetermined number of core slots 12 in the core 10. The end loop segments 42, 60, and 62 are shown in a three-phase winding pattern but those skilled in the art will appreciate that the end loop segments 42, 60, and 62 may be formed in, for example, a six-phase winding pattern, or any other winding pattern advantageous for producing electricity or for generating torque, as in the case of an electric motor. The end loop segments 42, 60, and 62 are preferably each disposed at the first end 18 or 18' of the stator core 10 or 10'.

The portion 46 attaches to a first slot segment, shown schematically at 64, which extends through one of the core slots 12 or 12' to the second end 20 or 20' of the stator core 10 or 10'. As the first slot segment 64 exits the second end 20 or 20', the first slot segment 64 is attached to an end of another end loop segment, shown schematically at 66, which is described in more detail below. The end loop segment 66 is attached at another end to a second slot segment, shown schematically at 68. The second slot segment 68 extends upwardly through another one of the core slots 12 or 12' of the stator core 10 or 10' and attaches to a portion 44a of an end loop segment 42a, which is substantially identical to the end loop segments 42, 60, and 62. Similarly, a portion 46a of the end loop segment 42a connects to another slot segment, discussed in more detail below. The pattern of connecting end loop segments 42, 66, and 42a and slot segments, such as the slot segments 64 and 68, as outlined above, continues throughout one substantial revolution about the circumference 14 of the stator core 10 or 10' to form a first wrap 49, having slot segments housed in layer 48, of a single phase of the stator winding 86.

The end loop segment 42a is shown adjacent a plurality of substantially identical end loop segments, indicated generally at 60a and 62a. The end loop segments 42a, 60a, and 62a are each connected to a corresponding plurality of slot segments, discussed in more detail below, such as the slot segments 64 and 68, which are each disposed in a respective core slot 12 or 12' of the stator core 10 or 10'. The slot segments are attached to a plurality of end loop segments, discussed in more detail below, that are substantially identical to the end loop segment 66. The end loop segments 42, 42a, 60, 60a, 62, and 62a, when attached to the slot segments and end loop segments, form a respective portion of a first wrap set of the complete stator winding 86 that is wound one substantial revolution about the circumference 14 of the stator core 10 of 10'. The end loop segments 42, 42a and 66 along with the attached slot segments, such as 64 and 68, form a portion of one phase of the winding 86. The term phase, as utilized herein, includes all conductors or wraps, such as 49, having slot segments housed in the same core slots 12. The structure of the wraps in the wrap set including wrap 49, creates a space, indicated generally at 190 in FIG. 6, within the end loop 62 and the end loop 42a, which is located in layer 48. The term structure, utilized herein, of winding 86 is defined as the shape of a partial wrap or wrap pertaining to the location and direction of the radial adjustments of the end loop segments on a particular end of the core. For example, after insertion into the core 10, the structure of wrap 49 differs from the structure of wrap 79, best seen in FIG. 7a and defined in more detail below, because the end loop segments, such as 42 of wrap 49 and 70 of wrap 79, located on the first end 18 of the core 10, differ due to the end loop segments having differing locations of radial adjustment portions, such as 58 and 84, as well as having radial adjustment portions, such as 56 and 82, that extend radial outwards in differing directions (respectively clockwise 21 and counterclockwise 23). The term structure, refers to the shape of the end loop segments of the partial wrap or wrap in the core 10, including the orientation in the core, but does not refer to position in the core slots 12. For example, the structure of wrap including end loop segments 60 and 60a has the same structure as the wrap 49 including end loop segments 42, 66 and 42a even though the two wraps are shifted a predetermined number of core slots 12 from each other. The space 190 is not occupied by the end loop segments of the wrap set including wrap 49 having slot segments in layer 48. The space 190 typically is a trapezoidal shape, however the space 190, may take any shape.

Preferably, each of the slot segments 64 and 68 and each of the end loop segment portions 42, 42a, 60, 60a, 62, 62a, and 66 are formed from rectangular wire and have a cross-sectional shape having a substantially constant width, thickness and cross sectional area. However, other shapes could also be employed such as round or square. For those skilled in the art, it is known that typical rectangular or square shaped conductors may include radii on the corners intermediate two adjacent edges.

Figure 7B:
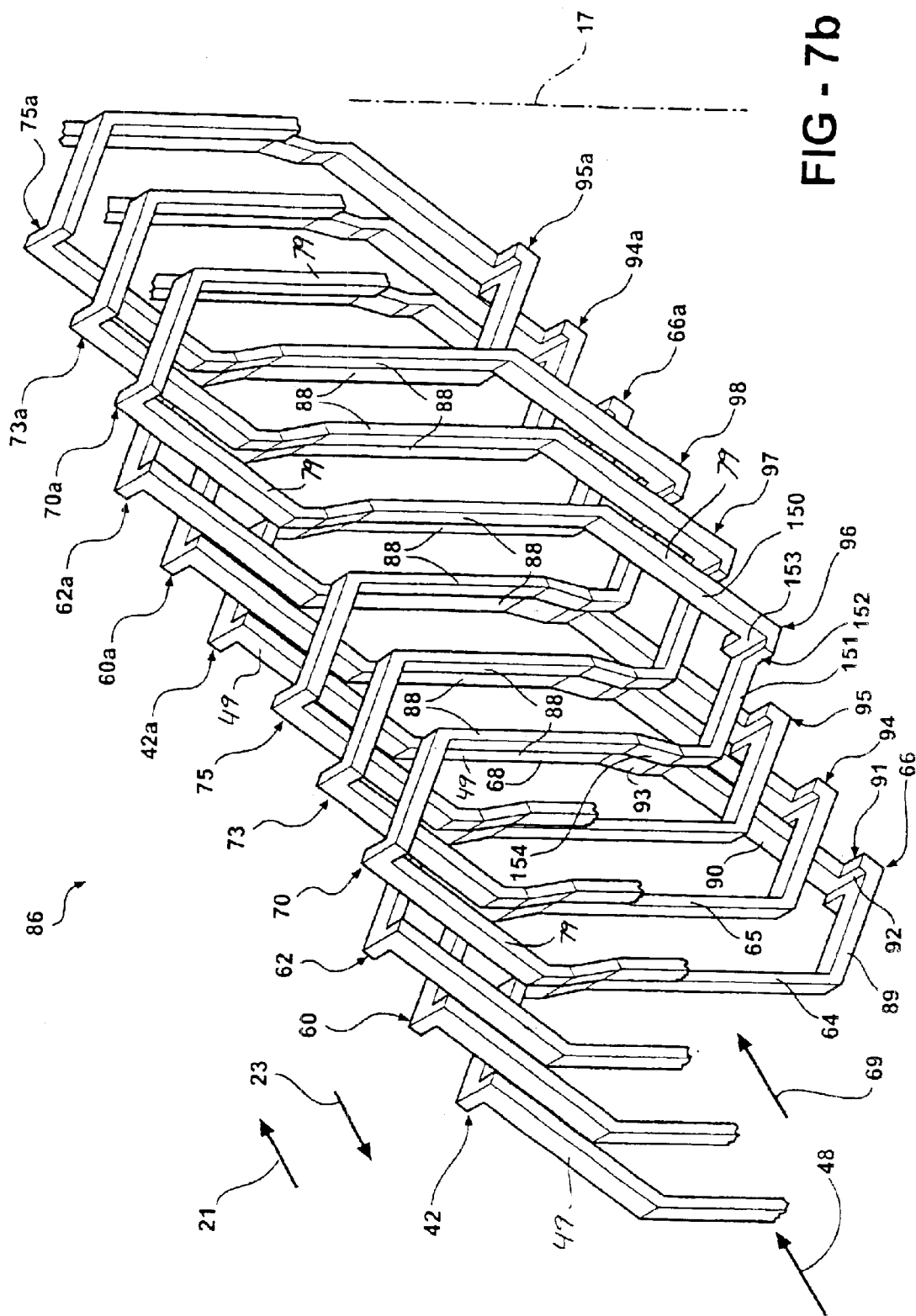
FIG. 7b is a perspective view of a plurality of wraps sets of end loop segments of the stator winding shown in FIG. 7a including a plurality of slot segments and end loop segments in accordance with the present invention.

Referring now to FIGS. 7a and 7b, a portion of first wrap set including wrap 49 including the end loop segments 42, 42a, 60, 60a, 62, 62a of FIG. 6, is shown with a portion of the second wrap set including a wrap, indicated generally at 79, of end loop segments connecting slot segments housed in a layer, indicated generally at 69. The reference wrap 79, as utilized herein, refers to the wrap having slot segments substantially housed within layer 69 and including end loop segment 70. The wrap 79 is located radially inward of the wrap 49 at a predetermined radial distance from the wrap 49. The wrap set including wrap 79, includes a plurality of end loop segments, indicated generally at 70, 73, and 75. The two wrap sets including wrap 49 and wrap 79 together form a portion of the stator winding, indicated generally at 86. The wrap 79 including the end loop 70 is similar to the wrap 49 including the end loop 42 except for three reasons. The first reason is because the wrap 79 is inserted into the core slots shifted by a predetermined number of slots from the wrap 49, discussed in more detail below. The second reason is because the structures differ on a particular end of the core, such as 18, due to the end loop segments, such as 70, of wrap 79, having radial extension portions, such as 82 at their apex portions, such as 80, which extend radial outwards in the counterclockwise direction 23, which is opposite the end loop segments, such as 42, of the wrap 49, having radial extension portions, such as 56 at their apex portions, such as 54, which extend radial outwards in the clockwise direction 21. The third reason is because the structures differ on a particular end of the core, such as 18, due to the end loop segments, such as 70, of the wrap 79 which have radial inward adjustments, such as 84 which are located counter-clockwise 23 from that end loop segment's apex portion, such as 80, which is opposite the end loop segments, such as 42, of the wrap 49 which have the radial inward adjustments, such as 58, located clockwise 21 from the end loop segments apex portion, such as 54.

The end loop segment 70 is described in the counter-clockwise direction 23. The end loop segment 70 includes a first sloped portion 76 and a second sloped portion 78 connected by an apex portion 80. The first sloped portion 76 is substantially co-radial with the layer 69, the first end portion 72 and the second end portion 74. The second sloped portion 78 is substantially non-co-radial with the layer 69, the first end portion 72 and the second end portion 74. The apex portion 80 includes a first radial extension portion 82. The first radial extension portion 82 extends from the first sloped portion 76 in the radially outward direction, which provides a radial outward adjustment for the end loop segment 70. A second radial extension portion 84 connects the second sloped portion 78 and the second end portion 74. The second radial extension portion 84 extends from the second sloped portion 78 in the radially inward direction, which provides a radial inward adjustment for the end loop segment 70. As can best be seen in FIG. 7a, the non-co-radial portion 78 of end loop segment 70 extends radially outward where it becomes substantially co-radial with layer 48, the first end portion 44 and the second end portion 46, but because it is shifted by a predetermined number of slots, discussed in more detail below, it nests in the space 190 of the end loop segments of the wrap set including wrap 49. This allows the end loop segments of the wraps set including wrap 49 and the wrap set including wrap 79 to nest together forming a two wrap set winding 86, which extends radially outward by one wire width beyond the layer 48 but does not extend radially inward beyond the innermost layer 69. The non co-radial portion 78 of end loop 70 is located in the space 190 of FIG. 6 found in the layer 48 of the end loop segments of the wrap set including wrap 49. Similarly, portions of end loop segments 73 and 75 extend into the space 190 of the wrap set including wrap 49.

For a winding with a plurality of layers, a third wrap set (not shown) which is substantially identical to the wrap set including wrap 49, would lay radial inward a predetermined radial distance from the wrap set including wrap 79 and have non-co-radial portions that would extend radially outward and be substantially co-radial with the layer 69 and therefore nest with the wrap set including wrap 79. For a pattern where the radial aligned wrap sets alternate between being substantially identical with the wrap set including wrap 49 and the wrap set including wrap 79, a pattern develops where the winding only extends radially outward by substantially one wire width of the outermost layer 48 but not radially inward of the innermost layer. This nesting effect allows a winding 86 with a plurality of wraps sets to be inserted into a stator core, such as the stator core 10 or 10', that extend radially outwardly of the position defined by the outermost layer by one wire width while not extending radially inwardly of the inner surface 14. The end loop segments 73 and 75 are substantially identical to the end loop segment 70, except they are shifted a predetermined number of slots.

Referring now to FIG. 7b, the wrap set including wrap 49 and the wrap set including wrap 79 are shown with a plurality of slot segments 88, which are substantially identical to the slot segments 64, 65, and 68. The end loop segment 66 of FIG. 6 of wrap 49 is shown having a first sloped portion 89 and a second sloped portion 90 connected by an apex portion 91. The first sloped portion 89 is substantially co-radial with the layer 48, and the slot segments 64 and 68. The second sloped portion 90 is substantially non-co-radial with the layer 48, and the slot segments 64 and 68. The apex portion 91 includes a first radial extension portion 92. The first radial extension portion 92 extends from the first sloped portion 89 in the radially outward direction, which provides a radial outward adjustment for the end loop segment 66. A second radial extension portion 93 connects the second sloped portion 90 and the slot segment 68. The second radial extension portion 93 extends from the second sloped portion 90 in the radially inward direction, which provides a radial inward adjustment for the end loop segment 66. The end loop segments 94 and 95 are substantially identical to the end loop segment 66.

Similarly, an end loop segment 96 of the wrap 79 is shown adjacent the end loop segment 95 of a wrap similar to wrap 49. The end loop segment 96 includes a first sloped portion 150 and a second sloped portion 151 connected by an apex portion 152. The first sloped portion 150 is substantially co-radial with the layer 69, and the slot segments 88 of the wrap 79. The second sloped portion 151 is substantially non-co-radial with the layer 69. The apex portion 152 includes a first radial extension portion 153. The first radial extension portion 153 extends from the first sloped portion 150 in the radially outward direction, which provides a radial outward adjustment for the end loop segment 96. A second radial extension portion 154 connects the second sloped portion 151 and the slot segment 88. The second radial extension portion 154 extends from the second sloped portion 151 in the radially inward direction, which provides a radial inward adjustment for the end loop segment 96. The end loop segments 97 and 98 are substantially identical to the end loop segment 96.

The slot segments 64, 65, 68, and 88 of each phase of the stator winding 86 are preferably disposed in respective core slots 12 or 12' at an equal pitch around the circumference 14 of the stator core 10 or 10'. Specifically, a slot segment of a phase, such as the slot segment 64, is disposed in a respective core slot 12 or 12' adjacent a slot segment 65 of the adjacent phase. The respective slot segments 64 and 65 are spaced apart by a circumferential distance or pitch 63, best seen in FIG. 6. The circumferential pitch 63 is substantially equal to the circumferential distance between a pair of adjacent core slots 12 or 12' in the stator core 10 or 10'. Each of the slot segments and end loop segments of the phase including the slot segment 64 remain disposed adjacent the respective slot segments and end loop segments of the phase including the slot segment 65 at the same circumferential pitch 63 throughout the length of the stator winding 86 and throughout the substantial revolution about the circumference 14 of the stator core 10 or 10'.

The radial depth 25 of the straight portion of the core slots 12 or 12' is preferably sized to receive at least two layers, such as the layers 48 and 69 of the stator winding 86, therein. The angled surfaces 30 and 32 are preferably formed in the slots 12' at the axial t ends 18' and 20' of the stator core 10', such that the slots 12' are long enough to accept the slot segments housed in layers 48 and 69, along with the radial adjustments 58 and 93 which mate to the angled surfaces 30 and 32.

Figure 9:
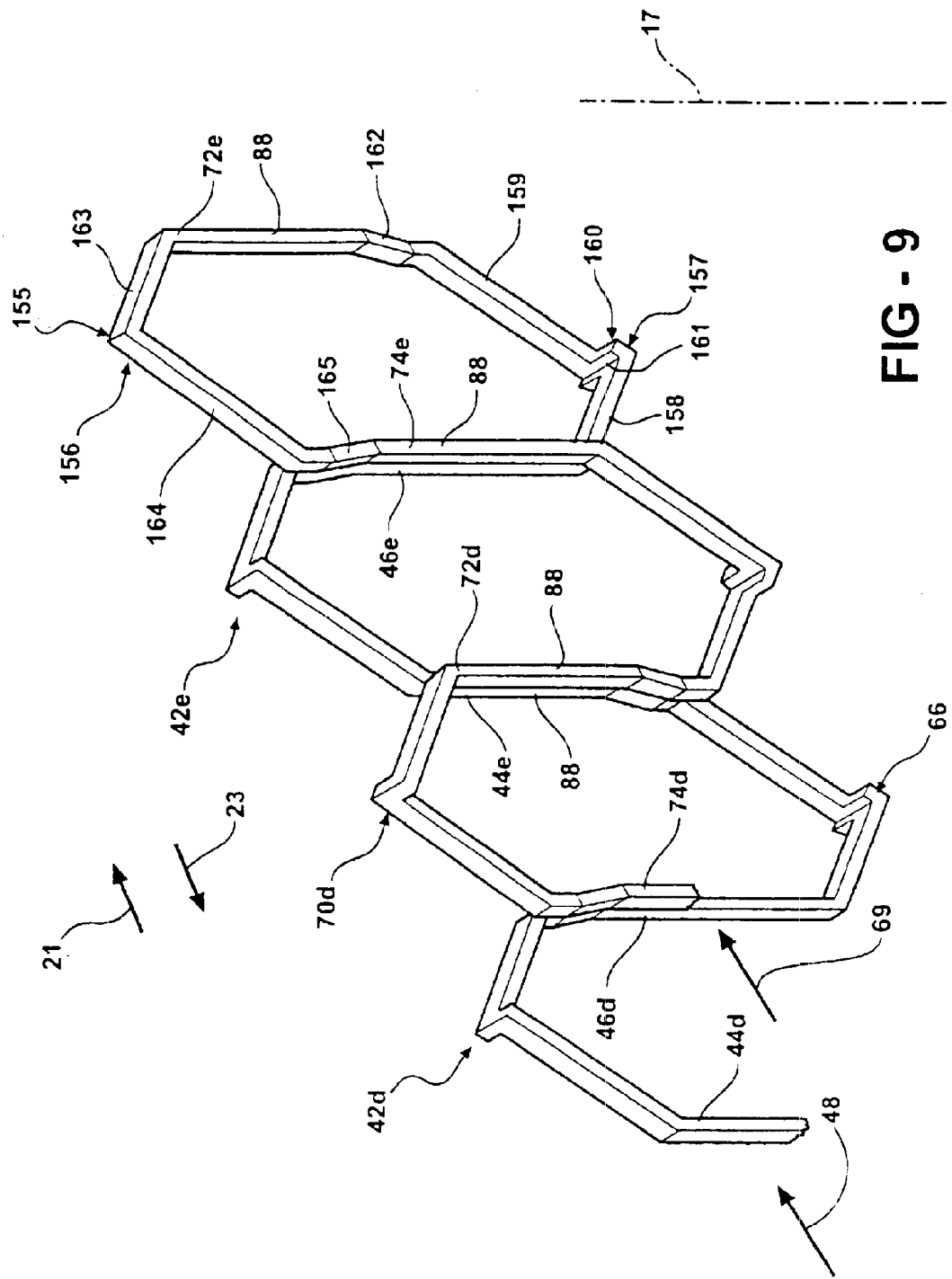
FIG. 9 is a perspective view of a reversing end loop portion of a stator winding in accordance with the present invention.

While the slot segments 88 are shown generally coplanar in FIGS. 7a, 7b, and 9 for illustrative purposes, the slot segments 88 are preferably adapted to be received by a radially curved surface, such as the interior surface 14 of the stator core 10 and, therefore, are not coplanar (i.e., the circumferential wrap 49 is flattened into a plane in FIG. 2) but are co-radial. The width of each of the slot segments 88, including any insulation, preferably fits closely to the width 13 of the core slots 12, including any insulation.

Figure 8:
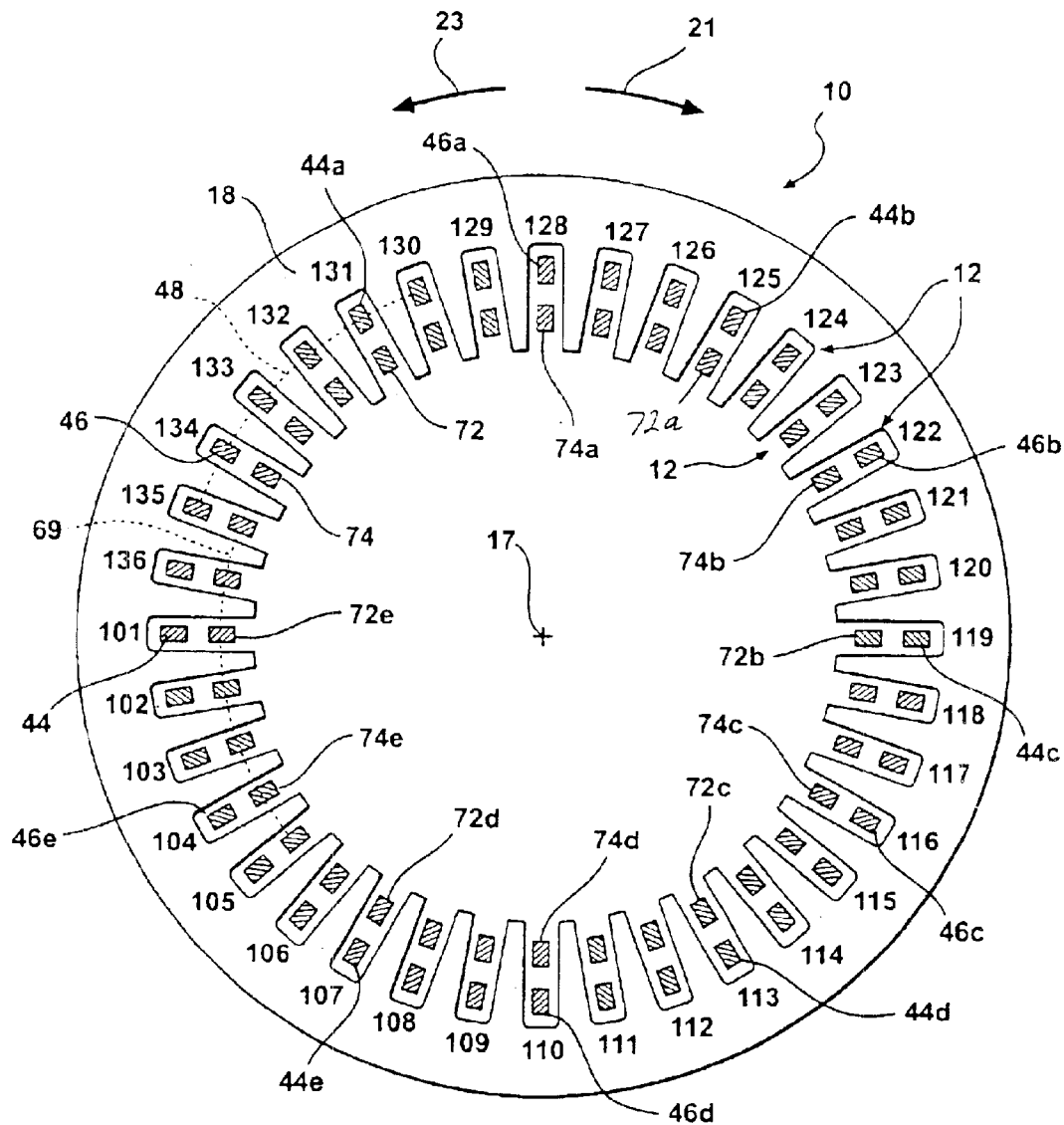
FIG. 8 is a schematic view of a stator core in accordance with the present invention and showing the locations of the various winding slot segments.

There is shown in FIG. 8, a plan schematic view of the stator core 10. The stator core 10 includes a total of thirty six core slots 12 numbered from 101 through 136 in increasing number in the circumferential counterclockwise direction 23. The stator winding 86 is adapted to be inserted in the core slots 12 to form a stator winding in accordance with the present invention as follows, wherein the core slots 12 belonging to each phase are predetermined by the total number of phases. In FIG. 8, the number of phases equals three.

When the stator winding 86 is formed, a first lead that connects to the slot segment 44 is inserted into the second axial end 20 of the core 10 in the slot number 101 and extends from the first axial end 18 of the core 10 in the slot number 101. The slot segment 46 is located in the slot number 134 and the end loop segment 42 connects the slot segments 44 and 46 at the first axial end 18. The slot segment 46 connects to the slot segment 64 in the slot number 134. The slot segment 64 extends through the slot 134 and exits the second axial end 20 of the core 10 of slot number 134, where it connects to the end loop segment 66. The end loop segment 66 connects the slot segment 64 exiting from slot number 134 with the slot segment 68 exiting from the slot number 131 and is located on the second axial end 20 of the core 10.

The subsequent end loop segments alternate locations on the axial ends 18 and 20 of the core 10 and connect slot segments in every slot 12 belonging to this phase. The slot segments are located as follows: a slot segment 46a is located in the slot number 128, a slot segment 44b is located in the slot number 125, a slot segment 46b is located in the slot number 122, a slot segment 44c is located in the slot number 119, a slot segment 46c is located in the slot number 116, a slot segment 44d is located in the slot number 113, a slot segment 46d is located in the slot number 110, a slot segment 44e is located in the slot number 107, and a slot segment 46e is located in the slot number 104. Each of the slot segments 44–44e and 46–46e, together with the associated end loop segments, form a continuous conductor of one phase of the stator winding 86. The slot segment 46e extends from the second end 20 of the stator core 10 as a second lead (not shown) and completes the wrap 49 of the continuous phase. The first lead of the wrap 49, therefore, extends from the slot number 101 and the second lead of the wrap 49 extends from the slot number 104. Each of the first and second leads is located on the second axial end 20 of the stator core 10.

The wrap 79 of the same phase lays radially inward of the wrap 49 and is shifted by a predetermined number of slots, such that the respective end loop segments in any particular circumferential location are on the opposite axial end 18 or 20 of the core 10 as the respective end loop segments of the first wrap 49.

A first lead that connects to the slot segment 74 is inserted into the second axial end 20 of the core 10 in the slot number 134 and extends from the first axial end 18 of the core 10 in the slot number 134. The slot segment 72 is located in the slot number 131 and the end loop segment 70 connects the slot segments 72 and 74 at the first axial end 18. The slot segment 72 connects to a slot segment, such as the slot segment 88, in the slot number 131. The slot segment 88 extends through the slot number 131 and exits the second axial end 20 of the core 10 of the slot number 131, where it connects to an end loop segment, such as the end loop segment 96 of FIG. 7b, that connects the slot segments exiting from slot number 131 with another slot segment 88 exiting from the slot number 128 and is located on the second axial end 20 of the core 10.

Similar to the wrap 49, the subsequent end loop segments alternate locations on the axial ends 18 and 20 of the core 10 and connect slot segments in every slot 12 belonging to this phase. The slot segments are located as follows: a slot segment 74*a* is located in the slot number 128, a slot segment 72*a* is located in the slot number 125, a slot segment 74*b* is located in the slot number 122, a slot segment 72*b* is located in the slot number 119, a slot segment 74*c* is located in the slot number 116, a slot segment 72*c* is located in the slot number 113, a slot segment 74*d* is located in the slot number 110, a slot segment 72*d* is located in the slot number 107, a slot segment 74*e* is located in the slot number 104, and a slot segment 72*e* is located in the slot number 101. Each of the slot segments 72–72*e* and 74–74*e*, together with the associated end loop segments, form a continuous phase of the stator winding 86. The slot segment 72*e* extends from the second end 20 of the stator core 10 as a second lead (not shown) and completes the wrap 79 of the continuous phase. The first lead of the wrap 79, therefore, extends from the slot number 134 and the second lead of wrap 79 extends from the slot number 101. Each of the first and second leads is located on the second axial end 20 of the stator core 10. Preferably, the first and second leads of each wrap 49 and 79 are connected to a rectifier (not shown), for supplying DC power to an automotive battery (not shown) or for providing starting torque for starting the engine. For the other two phases, wraps with structures substantially similar to wrap 49 and wrap 79 have slot segments housed in the core slots 12 shifted a predetermined number of cores slots 12, thereby forming a wrap set including wrap 49 and a wrap set including wrap 79.

Each of the respective end loop segments 42, 60, 62, 66, 70, 73, 75, 94, 95, 96, 97, and 98 of the conductors of the stator winding 42 are cascaded, meaning that for revolution of a circumference 14 around the stator core 10, each of the partial wraps or wraps can be serially radially inserted into the stator core 10 in a sequential order. For example, the wrap 49 including the end loop segment 42 is radially inserted for one substantial revolution about the circumference 14 of the stator core 10. After the wrap 49 including the end loop segment 42 is radially inserted, the wrap including the end loop segment 60 may be radially inserted for one substantial revolution about the circumference 14 of the stator core 10. This pattern is repeated for the wrap including the end loop segment 62 and then end loop segment 75 and then end loop segment 73 and finally end loop segment 70. Similarly, a plurality of wrap sets, such as the wrap sets including wrap 49 and wrap 79, may be serially radially inserted into the stator core 10. The description of serial radial insertion is only used to help define the cascaded winding and is not intended to restrict the process of inserting the winding 86 into the stator core 10. As seen in FIG. 7*b*, when the wraps are inserted in this manner, the entirety of each of the wraps may be wound about the circumference 14 of the stator core 10 without interfering with any of the other wraps. Preferably, the slot segments of the wraps 49 and 79 are aligned in one radial row in each slot 12 or 12'.

The conductor including end loop segment 42 of wrap 49, and the conductor including end loop segment 70 of wrap 79, include slot segments which coexist in the same core slots, as can best be seen in FIG. 7*a*. Therefore, these two conductors are the conductors of one phase. Furthermore, because each conductor passes circumferentially once around the core, the phase of a winding with two wraps 49 and 79, is comprised of two conductors, each passing one substantial revolution around the core 10. Similarly, the two conductors including end loop segments 60 and 73 coexist as a second phase and the conductors including end loop segments 62 and 75 coexist as a third phase, best seen in FIG. 7*a*. When a plurality of wraps of one phase, such as wrap 49 and wrap 79, are connected in series, each substantial revolution around the core of the wrap comprises an electrical turn, such that the number of wraps of one phase is equal to the number of electrical turns. Because of the cascaded winding arrangement, a high slot fill stator with conductors aligned in radial layers in each core slot, an odd number of wraps connected in series creates an odd number of electrical turns.

Alternatively, the wraps 49 and 79 of one particular phase are formed from one single continuous conductor. The phase winds around the core 10, alternating end loop segments with slot segments in predetermined core slots 12, in one circumferential direction as the radially outer wrap 49 of the winding 86 and then reverses direction and winds around the core in the opposite circumferential direction as the radially inner wrap 79 of the winding 86. When the first slot segment 46*e* extends from the axial end 20 of the stator core, instead of extending from the stator core 10 as a second lead, it extends radially inwardly and connects to an end loop segment, which enters the slot number 101 in the radially inward layer 69 to connect to the slot segment 72*e*. This wind pattern creates a reversing end loop segment 156, best seen in FIG. 9.

Referring now to FIG. 9, the reversing end loop segment 156 is shown connecting the wrap 49 and the wrap 79 of one of the phases from FIGS. 7*a* and 7*b* and is shown adjacent an end loop segment 42*d*, which connects slot segments 44*d* and 46*d*, an end loop segment 42*e*, which connects slot segment 44*e* and 46*e* and an end loop segment 70*d*, which connects slot segments 72*d* and 74*d*. The end loop segment 157 includes a first sloped portion 158 and a second sloped portion 159 connected by an apex portion 160. The first sloped portion 158 is substantially co-radial with the layer 48. The second sloped portion 159 is substantially non-co-radial with the layer 48. The apex portion 160 includes a first radial extension portion 161. The first radial extension portion 161 extends from the first sloped portion 158 in the radially outward direction, which provides a radial outward adjustment for the lower end loop segment 157. A second radial extension portion 162 connects the second sloped portion 159 and the slot segment 88. The second radial extension portion 162 extends from the second sloped portion 159 in the radially inward direction, which provides a radial inward adjustment for the lower end loop segment 157. The lower end loop segment 157, therefore, is substantially identical to the end loop segment 66.

The reversing end loop segment 156 includes a first sloped portion 163 and a second sloped portion 164 connected by an apex portion 155. The first sloped portion 163 and the second sloped portion 164 are shown substantially co-radial with the layer 48, but they may be co-radial with any layer. The apex portion 155 is a straight connection between the first sloped portion 163 and the second sloped portion 164 and may not include a radial adjustment. The reversing end loop segment of each phase, such as 156, may include a plurality of radial adjustments as seen in FIG. 10 to allow the reversing end loop segment of each phase to nest without violating the physical space of the other reversing end loop segments. A radial extension portion 166 connects the second sloped side 164 to the slot segment 74*e*.

The reversing end loop segment 156 along with the transition end loop segment 176, described in more detail below, allow three wraps for each phase to be pre-formed of a single continuous conductor for a three phase, three wrap set stator winding. Referring to FIG. 10, a pre-formed winding is shown generally at 180. The winding 180 includes two lengths of cascaded windings, wraps sets that are attached to one another by a reversing end loop segment 156 for each phase. The pre-formed winding 180 is then coiled and placed into a stator core 10. Three portions 182, 184, 186 of the pre-formed winding are readily identifiable. A first portion 182, having structures and pre-forms substantially similar to the wrap 79, comprises the entire length of the first length of cascaded winding 180. A second portion 184 having structures and pre-forms substantially similar to the wrap 49 and comprises a portion of the second length of cascaded winding 180, wherein the first portion 182 and the second portion 184 are attached via the reversing end loop segment 156 for each phase. The third portion 186, having structures and pre-forms substantially similar the wrap 49, comprises the part of the second length of cascaded winding 180 that extends beyond the second portion 18, wherein the third portion 186 and the second portion 184, for each phase, are attached via the transition end loop segment 176, described in more detail below. Although the winding 180 of FIG. 10 and 11 is shown with three layers, three wraps per phase, three wrap sets and therefore three electrical turns, it is obvious to those skilled in the art that any number of layers, wraps per phase, wrap sets and therefore electrical turns, can be produced, such as four or five. In the case where four layers and wrap sets are desired, a fourth portion not shown in FIG. 10 would have wraps with substantially similar pre-forms and structures of the wrap of portion 182 and it would extend beyond the first portion 182, wherein the fourth portion and the first portion 182 for a particular phase are attached via a transition end loop segment, described in more detail below. Referring to FIG. 11, after the pre-formed winding 180 is coiled, the second portion 184 comprises an inner most wrap set of the winding 180, the first portion 182 comprises a middle wrap set of the winding 180, and the third portion 186 comprises an outer most wrap set of the winding 180. Therefore, the coiled winding 180 adheres to the requirement that wraps with structures similar to wrap 49 radially alternate with wraps with structures similar to wrap 79. Although the winding 180 in FIG. 11 is shown as a continuous conductor for each phase, the winding 180 for each phase could be made of two or more individual conductors that are joined together. In this case, the reversing loop segments 156 is created by connecting the end of the portion 182 with the end of the portion 184 of a particular phase. This joining process may, in fact be desirable in replace of a continuous reversing loop 156 due to the complexity of forming the reversing loop 156 as a continuous conductor.

In the stator core 10 of FIG. 1, the radial adjustments, such as the radial extension portions 58, 84, 162, and 166 are located exterior of the stator core slots 12 and adjacent a respective upper and lower surface of the first axial end 18 and the second axial end 20 of the stator core 10. Alternatively, the stator winding 86 is installed in the stator core 10' and the radial extension portions 58, 84, 162, and 166, are located in the interior of the stator core 10' in the core slots 12' adjacent the angled surface 30 of the first axial end 18' and the angled 32 of the second axial end 20' of the stator core 10'.

The end loop segments 42, 60, and 62 of the phases are substantially identical, which advantageously allows each of these wraps for different phases to be pre formed from the same tooling. Similarly, the end loop segments 70, 73, and 75 are substantially identical, which advantageously allows each of these wraps belonging to different phases to be pre-formed from the same tooling. Furthermore, as best seen in FIG. 9, excluding any special end loop segments such as 156, the pre-form of wrap 79 is substantially similar to the pre-form of wrap 49 except prior to coiling and inserting into the core 10, the pre-form of wrap 79 is rotated 180 degrees around an axis that bypasses through the midpoint of the slot segments and then rotated 180 degrees around an axial axis that is parallel to the slot segments. This advantageously allows all of the wraps, including wraps similar to wrap 49 and wrap 79, to be pre-formed from one set of tooling. The term pre-form, utilized herein, describes the shape of a wrap pertaining to the radial adjustments of the end loop segments, similarly as the term structure except prior to coiling and inserting into the core 10. In contrast, the term structure, describes a pre-form after it has been coiled and inserted into a core 10. Therefore, although the pre-form of wrap 49 is substantially similar to the pre-form of wrap 79, the structure of wrap 49 differs from the structure of wrap 70 due to the rotation of the pre-form of wrap 79 prior to insertion into the core 10.

While the stator winding 86 has been shown and described as a three phase stator winding, those skilled in the art, however, will appreciate that the stator winding 86 could be formed as a six phase winding or any other pattern advantageous for producing electrical power or for generating torque, as in the case of an electric motor. Although the stator winding 86 has been shown as having two layers 48 and 69, two wrap sets and therefore two conductors in each slot, it is often desirable to have a stator winding with more layers and wrap sets, such as four, and more conductors in each slot. This can be achieved by installing a plurality of wrap sets including wraps with structures substantially identical to wrap 49 and wrap sets including wraps with structures 79 and radially alternating the wrap sets including the wrap 49 with wrap sets including the wrap 79, resulting in a plurality of wrap sets, a plurality of layers and a plurality of conductors in each slot. Furthermore, the plurality of substantially similar wraps for a particular phase, such as wraps substantially similar to wrap 49, may be formed of one continuous conductor as can be seen as portions 184 and 186 of winding 180 in FIG. 10. The continuous conductor of a particular phase includes a lower transition end loop segment, indicated generally at 175, and an upper end loop segment, indicated generally at 176 of winding 180 shown in FIG. 10. The transition end loop segments 175 and 176 connect two portions 184 and 186 of one phase in one continuous wire. Similarly to the reversing loop segment 156, it may be desirable to create the transition end loop segment 175 or 176 by joining two or more individual conductors. In this case the transition end loop segment 175 or 176 is created by connecting the end of the individual portion 184 of one phase with the beginning of the individual portion 186 of the same phase. As can be seen in FIG. 11, once coiled, the portions 184 and 186, which are formed substantially similar to wrap set including wrap 49 of the winding 180, form respectively the radial innermost wrap set and the radial outermost wrap set.

The winding 180 of FIG. 10 is coiled and inserted into a core 10 resulting in a winding having three slot segments housed in each core slot 12 and therefore having three layers; an outermost, a middle, and an innermost. The slot segment, indicated generally at 210, of portion 184 is inserted into the outermost layer of a particular core slot 12. The subsequent slot segments, including slot segment indicated generally at 240, of portion 184, which are located between slot segment 210 and a slot segment, indicated generally at 215, are inserted in core slots 12 located in the outermost layer. The slot segments, such as the slot segment indicated generally at 250, of portion 182 are inserted into the core slots 12 laying radially inward of the slot segments, such as 240, of portion 184 and therefore are located in the middle layer. After one substantial revolution around the core 10, the slot segment, indicated generally at 220, of winding 180 is inserted in the same particular core slot 12 as the slot segment 210 of portion 184 except that it lays radially inward of slot segment 210 and therefore is located in the middle layer. Therefore, it is readily apparent that the lower transition end loop 175 connects a slot segment 215 located in the outermost layer with a slot segment 220 located in the middle layer. The next slot segment, indicated generally at 230, of that particular phase is inserted in the next core slot 12 of that particular phase, laying radially inward of slot segments 240 and 250 and therefore located in the innermost layer. Therefore, it is readily apparent that the upper transition end loop segment 176, connects a slot segment 220 located in a middle layer with a slot segment 230 located in an innermost layers. Hence, the upper and lower transition end loop segments, such as 175 and 176, connect slot segments, such as 215, 220 and 230 housed in different core slots 12 and located in different layers. The other two phases of winding 180 are similar to the phase including slot segments 210, 215, 220, 230, 240 and 250, except they have slot segments inserted into core slots 12 of stator core 10 that are shifted a predetermined number of core slots 12.

Figure 12:
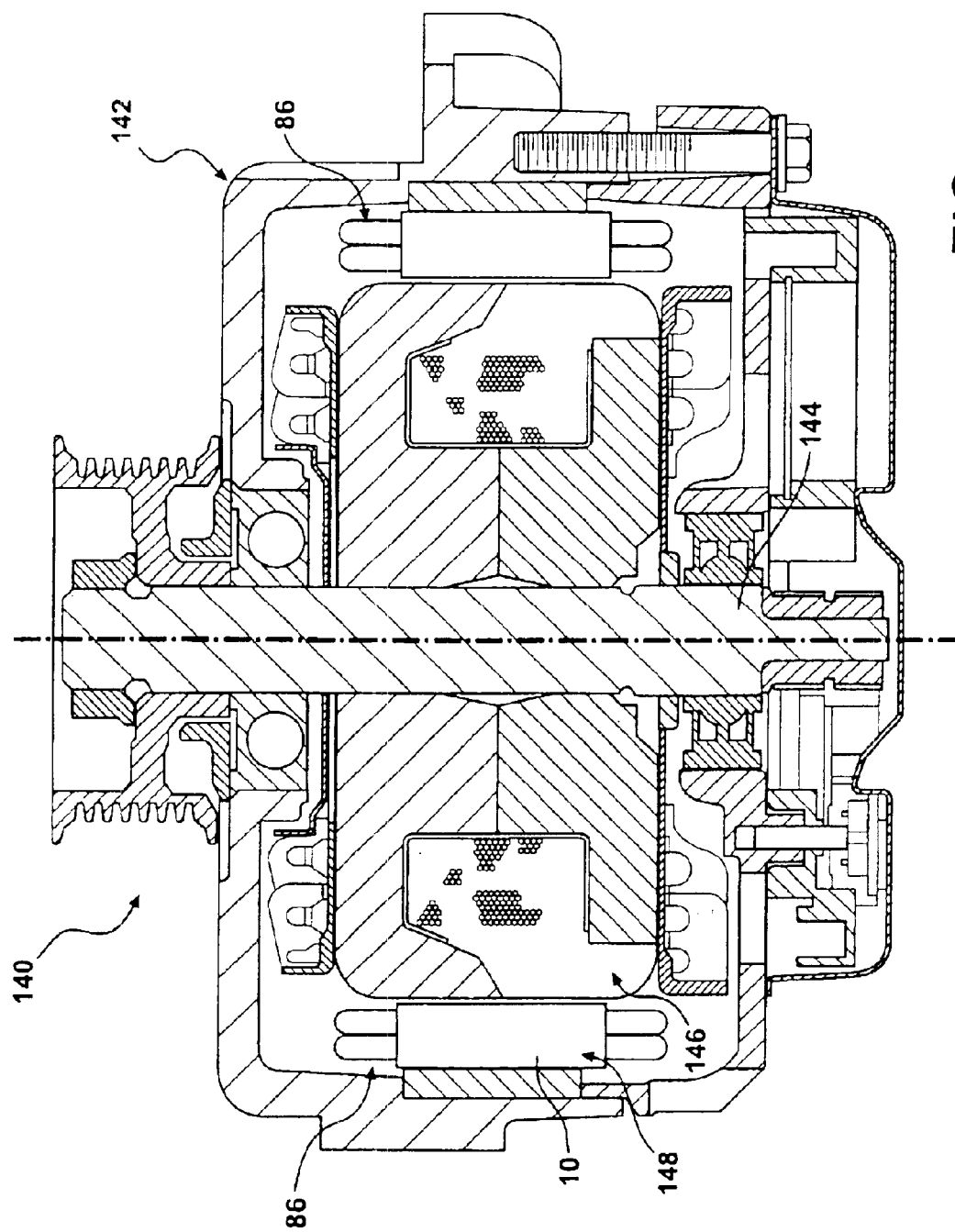
FIG. 12 is a cross-sectional view of an alternator in accordance with the present invention.

Referring now to FIG. 12, a dynamoelectric machine in accordance with the present invention is indicated generally at 140. The dynamoelectric machine is preferably an alternator, but those skilled in the art will appreciate that the dynamoelectric machine can be, but is not limited to, an electric motor, an integrated starter-motor, or the like. The dynamoelectric machine 140 includes a housing 142 having a shaft 144 rotatably supported by the housing 142. A rotor assembly 146 is supported by and adapted to rotate with the shaft 144. The rotor assembly can be, but is not limited to, a "claw pole" rotor, a permanent magnet non claw pale rotor, a permanent magnet claw pole rotor, a salient field wound rotor or an induction type rotor. A stator assembly 148 is fixedly disposed in the housing 142 adjacent the rotor assembly 146. The stator assembly 148 includes a stator core, such as the stator core 10 and a winding, such as the stator winding 86.

In accordance with the provisions of the patent statutes, the present invention has been described in what is considered to represent its preferred embodiment. However, it should be noted that the invention can be practiced otherwise than as specifically illustrated and described.

What is claimed is:

1. A stator for an electric machine, comprising:
   a generally cylindrically-shaped stator core having a plurality of circumferentially spaced and axially-extending core slots in a surface thereof, said core slots extending between a first and a second end of said stator core; and
   a stator winding having a plurality of phases, each of said phases comprising a plurality of partial wraps which are aligned in a radial direction;
   said plurality of partial wraps having a plurality of slot segments disposed in said core slots, said slot segments alternately connected at said first and second ends of said stator core by a plurality of end loop segments; and
   said plurality of partial wraps of at least one of said phases include at least one partial wrap having a first structure and at least one partial wrap having a second structure wherein said first structures alternate in the radial direction with said second structures;
   said end loop segments of a particular partial wrap include a first sloped portion substantially co-radial with said slot segments of said particular partial wrap and a second sloped portion substantially non-co-radial with said slot segments of said particular partial wrap.

2. The stator of claim 1 wherein said first structure of said partial wraps having said first structure and having slot segments housed in a particular layer, creates a space in the same particular layer.

3. The stator of claim 2, wherein a portion of said end loop segments of said partial wraps having said second structure extends into the space created in said particular layer.

4. The stator according to claim 1 wherein for at least one of said plurality of phases, said partial wrap having said first structure is shifted a predetermined number of slots from said partial wrap having said second structure such that in a particular circumferential location, said end loop segments of said first structure are on opposite axial ends of said stator core as said end loop segments of said second structure.

5. The stator according to claim 1 wherein at least three consecutive said slot segments of at least one of said partial wraps is housed at substantially the same radial distance from the central axis of said stator core.

6. The stator according to claim 1 wherein each of said core slots house an odd number of said slot segments.

7. The stator according to claim 1 wherein at least one of said phases includes an odd number of said partial wraps aligned n the radial direction.

8. The stator according to claim 1 wherein this plurality of said phases equals six.

9. The stator of claim 1 wherein said partial wraps having said first structure are wound around the stator core for one substantial revolution and said partial wraps having said second structure are wound around the stator core for one substantial revolution.

10. The stator of claim 9 wherein at least one of said wraps of at least one of said phases is formed from one continuous conductor.

11. The stator according to claim 9 wherein said wrap having said first structure and said wrap having said second structure, of at least one of said phases, are formed from a continuous conductor including a reversing end loop segment.

12. The stator according to claim 9 wherein at least one of said wraps having said first structure and at least one of said wraps having said second structure, of at least one of said phases, are individual conductors including a reversing end loop segment.

13. The stator according to claim 9 wherein at least two of said wraps having said first structure, of at least one of said phases, are individual conductors including a transition end loop segment.

14. The stator according to claim 9 wherein at least two of said wraps having said first structure, of at least one of said phases, are formed from a continuous conductor including a transition end loop segment.

15. The stator according to claim 1 wherein said second structure and said first structure of said partial wraps are comprised of substantially similar pre-forms and one of said pre-forms is rotated 180 degree around at least one axis prior to insertion into the core.

16. The stator of claim 1 wherein the number of said partial wraps which are aligned in the radial direction is greater than three.

17. The stator of according to claim 1 wherein said slot segments of at least one of said partial wraps have a rectangular cross section.

18. The stator according to claim 17 wherein said stator core slots have a substantially rectangular cross section.

19. The stator according to claim 17 wherein the width of said slot segments, including any insulation, fit closely to the width of said core slots, including any insulation.

20. The stator according to claim 1 wherein said slot segments housed in said core slots are aligned in at least one radial row.

21. The stator according to claim 1 wherein said winding includes at least one wrap set comprised of a plurality of said partial wraps, having each of sold slot segments of said plurality or said partial wraps being housed in substantially the same layer.

22. The stator according to claim 1 wherein a plurality of said end loop segments include at least two radial adjustments per end loop segment.

23. The stator according to claim 1 wherein said plurality of partial wraps are cascaded.

24. The stator according to claim 1 wherein at least one of said partial wraps is formed of a continuous conductor having a substantially constant width and thickness and therefore substantially constant cross sectional area.

25. A stator for an electric machine, comprising:
a generally cylindrically-shaped stator core having a plurality of circumferentially spaced and axially-extending core slots in a surface thereof, said core slots extending between a first and a second end of said stator core; and
a stator winding having a plurality of phases, each of said phases comprising a plurality of wraps having a plurality of slot segments disposed in said core slots, said slot segments alternately connected at said first and second ends of said stator core by a plurality of end loop segments, each of said slot segments of a particular wrap being a substantially same radial distance from a central axis of said stator core;
said plurality of wraps including at least one wrap having a first structure and at least one wrap having a second structure wherein said first structures alternate in the radial direction with said second structures;
said wrap having said first structure of each phase being shifted a predetermined number of slots from said wrap having said second structure of the same phase such that in a particular circumferential location, said end loop segments of said first structure are on opposite axial ends of said stator core as said end loop segments of said second structure;
wherein said end loop segments of each particular layer include a first sloped portion, a second sloped portion, said first and second sloped portions connected by an apex portion thereof; and
wherein at least half of said end loop segments include a radial outward adjustment and a radial inward adjustment.

26. The stator according to claim 25 wherein said outward radial adjustment is a first radial extension at said apex portion and said radial inward adjustment is a second radial extension adjacent one of said slot segments.

27. The stator according to claim 25 wherein the conductors are substantially aligned in one radial row in at least half of said slots.

28. The stator according to claim 25 wherein a portion of said end loop segments of said conductors lay radially outward by one substantial conductor width for an outermost layer.

29. The stator according to claim 25 wherein said plurality of wraps are cascaded.

30. A stator for an electric machine, comprising:
a generally cylindrically-shaped stator core having a plurality of circumferentially spaced and axially-extending core slots in a surface thereof, said core slots extending between a first and a second end of said stator core; and
a stator winding having a plurality of phases, each of said phases comprising a plurality of partial wraps which are aligned in a radial direction;
said plurality of partial wraps having a plurality of slot segments disposed in said core slots, said slot segments alternately connected at said first and second ends of said stator core by a plurality of end loop segments;
wherein at least one of said plurality of partial wraps includes at least three consecutive slot segments disposed in substantially a first layer and at least one other of said plurality of partial wraps includes at least three consecutive slot segments disposed in substantially a second layer;
said plurality of partial wraps of at least one of said phases include at least one partial wrap having a first structure and at least one partial wrap having a second structure wherein said first structures alternate in the radial direction with at sold second structures; and
said plurality of said end loop segments include at least two radial adjustments per end loop segment and wherein said plurality of end loop segments of a particular one of said partial wraps having slot segments housed in a particular layer, include a portion which is substantially co-radial with the slot segments of a different layer.

31. The stator according to claim 30 wherein said end loop segments of a particular partial wrap include a sloped portion which is substantially co-radial with said slot segments of a different layer.

32. The stator according to claim 30 wherein at least one of said partial wraps is formed of a continuous conductor having a substantially constant width and thickness and therefore substantially constant cross sectional area.

33. The stator according to claim 30 wherein for at least one of said plurality of phases, said partial wrap having said first structure is shifted a predetermined number of slots from said partial wrap having said second structure such that in a particular circumferential location, said end loop segments of said first structure are on opposite axial ends of said stator core as said end loop segments of said second structure.

34. The stator according to claim 30 wherein said plurality of end loop segments are formed such that said plurality of partial wraps are cascaded.

* * * * *

UNITED STATES PATENT AND TRADEMARK OFFICE
CERTIFICATE OF CORRECTION

PATENT NO. : 6,885,124 B2
DATED : April 26, 2005
INVENTOR(S) : Kirk E. Neet

It is certified that error appears in the above-identified patent and that said Letters Patent is hereby corrected as shown below:

Column 16,
Line 65, after "The stator" delete "of".

Signed and Sealed this

Eighteenth Day of April, 2006

JON W. DUDAS
*Director of the United States Patent and Trademark Office*